United States Patent [19]

Blakeley et al.

[11] Patent Number: 5,118,257
[45] Date of Patent: Jun. 2, 1992

[54] BOOT ATTACHMENT FOR COMPOSITE TURBINE BLADE, TUBINE BLADE AND METHOD OF MAKING TURBINE BLADE

[75] Inventors: Anthony Blakeley; Gregory E. Horihan; Timothy S. Konicek; Patrick J. O'Callaghan; Martin W. Carrington; Jeffrey A. Brown, all of Rockford, Ill.

[73] Assignee: Sundstrand Corporation, Rockford, Ill.

[21] Appl. No.: 528,477

[22] Filed: May 25, 1990

[51] Int. Cl.$^5$ ............................................. B63H 1/20
[52] U.S. Cl. ........................ 416/219 R; 416/223 R; 416/226; 416/229 R; 416/230; 416/239; 416/241 A; 29/889.21; 29/889.71
[58] Field of Search ............... 416/223 R, 226, 239, 416/241 A, 219 R, 229 R, 230, 60, 248; 29/888.25, 889.21, 889.71, 527.2; 264/258, 135

[56] References Cited

U.S. PATENT DOCUMENTS

| | | | |
|---|---|---|---|
| 1,878,816 | 9/1932 | Bucklen | 416/239 |
| 2,115,454 | 3/1936 | Berliner . | |
| 2,511,862 | 6/1950 | Martin . | |
| 3,303,889 | 2/1967 | Bates | 416/239 |
| 3,352,955 | 11/1967 | Pigott | 264/135 |
| 3,368,795 | 2/1968 | Bolin et al. . | |
| 3,603,701 | 9/1971 | Tarcrynski . | |
| 3,731,360 | 5/1973 | Stone, Jr. . | |
| 3,756,746 | 9/1973 | Baker . | |
| 3,765,124 | 10/1973 | Ferris et al. | 416/226 |
| 3,782,856 | 1/1974 | Salkind et al. . | |
| 3,883,267 | 5/1975 | Baudier et al. . | |
| 3,903,578 | 9/1975 | Rothman | 29/889.71 |
| 3,923,421 | 12/1975 | Carter et al. . | |
| 3,950,115 | 4/1976 | Euler . | |
| 4,031,601 | 7/1977 | Staub et al. . | |
| 4,060,413 | 11/1977 | Mazzei et al. . | |
| 4,095,322 | 6/1978 | Scarpatti et al. | 416/226 X |
| 4,169,749 | 10/1979 | Clark | 416/226 X |
| 4,188,171 | 2/1980 | Baskin | 416/226 |
| 4,247,255 | 1/1981 | De Rosa | 416/226 X |
| 4,268,571 | 5/1981 | McCarthy | 416/229 R |
| 4,278,401 | 7/1981 | Martinelli . | |
| 4,295,907 | 10/1981 | Cordts et al. . | |
| 4,470,862 | 9/1984 | More et al. | 29/889.71 X |
| 4,537,091 | 8/1985 | Kulkarni et al. | 416/60 X |
| 4,621,980 | 11/1986 | Reavely et al. | 416/226 |
| 4,648,921 | 3/1987 | Nutter, Jr. . | |
| 4,706,364 | 11/1987 | Aubry | 29/527.2 X |
| 4,720,244 | 1/1988 | Kluppel et al. . | |
| 4,815,940 | 3/1989 | Leshane et al. . | |
| 4,832,990 | 5/1989 | Boccalon et al. . | |
| 4,834,616 | 5/1989 | Kasarsky et al. | 29/889.21 X |
| 4,990,205 | 2/1991 | Barbier et al. | 416/239 X |

FOREIGN PATENT DOCUMENTS

| | | | |
|---|---|---|---|
| 0015785 | 9/1980 | European Pat. Off. | 264/258 |
| 2825191 | 1/1979 | Fed. Rep. of Germany | 264/258 |
| 3015208 | 11/1981 | Fed. Rep. of Germany | 416/241 A |
| 3185615 | 8/1988 | Japan | 264/258 |
| 282577 | 3/1971 | U.S.S.R. | 416/239 |
| 333249 | 8/1930 | United Kingdom | 416/239 |
| 831380 | 5/1980 | United Kingdom . | |
| 2218473 | 11/1989 | United Kingdom . | |

Primary Examiner—Edward K. Look
Assistant Examiner—Todd Mattingly
Attorney, Agent, or Firm—Antonelli, Terry, Stout & Kraus

[57] ABSTRACT

A root attachment for a turbine blade is integrally molded with a composite turbine blade for a ram air turbine. The root attachment includes an insert at the one end of the root attachment for integrally molding within the blade and a hub connector at an opposite end for connecting the blade to a rotor hub. The insert has a geometry and surface area such that a dual load carrying capability is achieved during molding by the formation of an adhesive bond between the material of the blade and the insert and also a mechanical locking which resists failure in bearing. Each of the adhesive bond and the mechanical locking is designed to fail above an ultimate design load.

4 Claims, 3 Drawing Sheets

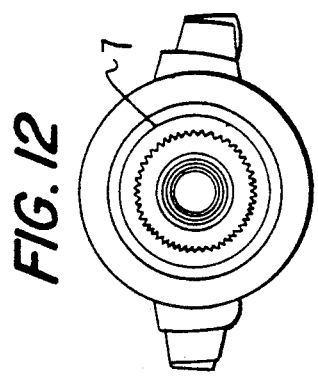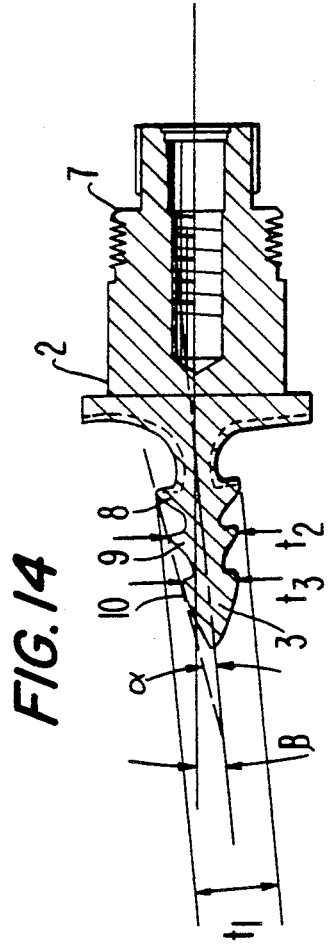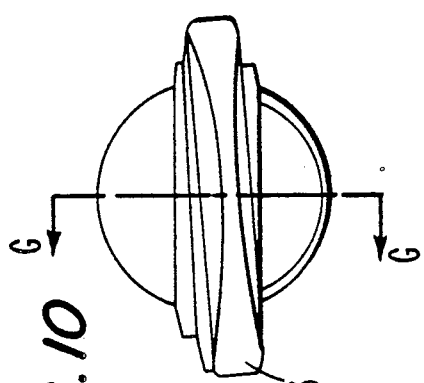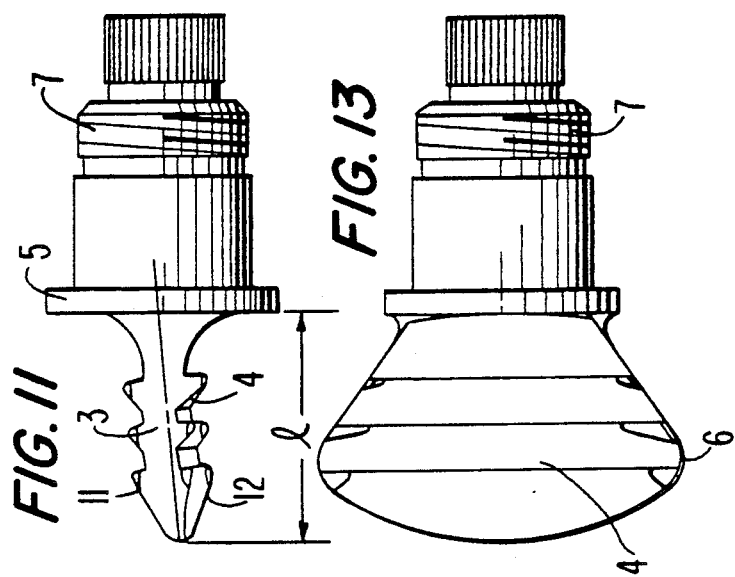

BOOT ATTACHMENT FOR COMPOSITE TURBINE BLADE, TUBINE BLADE AND METHOD OF MAKING TURBINE BLADE

TECHNICAL FIELD

This invention relates generally to a rotor attachment adapted to be integrally molded to a composite turbine blade, the resultant turbine blade and the method of making the same.

BACKGROUND ART

Composite rotor blades conventionally are mechanically retained on a rotor hub by a root fitting or attachment which effectively transfers dynamic loading from the composite blade structure, through the fitting, to the rotor hub. In rotor blades of advanced composite structure, problems arise in transmitting the dynamic loads to the rotor hub. These loads include the torque, tension and bending loads on the rotor blades which must be transmitted to the rotor hub. In other words, the root attachment or fitting provides a path for loads from the composite structure to the rotor hub.

In the case of metallic blades which are retained for rotation upon the periphery of the rotor hub, a wide variety of mechanical fittings or attachment means are available and are quite effective. However, the trend toward incorporating composite blades into rotor assemblies has produced unique problems not heretofore experienced. By the term "composite blades" it is meant those blades formed by small diameter filaments of high strength, and high modulus of elasticity, embedded in a lightweight matrix. Typical examples are the nonmetallic composites such as graphite filaments with an epoxy resin matrix material, and certain metallic composites in a matrix such as aluminum.

The interface of composite materials of rotor blades and metallic elements of the rotor hub has been analytically and experimentally shown to be the crucial link in making composite rotor blade assemblies. This is the area where most problems occur, i.e. the area of transmitting the dynamic loads on the composite rotor blade to the metallic rotor hub. In the past, spade-type configurations have been used for the composite-to-metallic interface. Long fibers from the composite blade have been wound around the spade and bonded thereto with a resin. However, during fatigue life testing, the resin bonded to the metallic spade tends to separate and fail at that interface. The laminating of multiple plies of long fibers about the spade-type configurations can also be very time consuming hence costly. Winding of fibers around metallic elements may also not be possible where long fibers are not employed in the rotor blade materials.

Other attempts to solve the aforementioned problems are shown in U.S. Pat. Nos. 3,603,701; 3,731,360 and 4,031,601. U.S. Pat. No. 3,603,701 shows a system for transferring the dynamic loading forces from a composite rotor blade held between opposing external and internal metallic fittings, with a locknut in communication with a key to transmit torque from the internal fitting by a preloading scheme. U.S. Pat. No. 3,731,360 shows a method of making a composite blade with an integral root, in a compacting and bonding operation, and positioning a wedge between spread layers of the composite blade structure at the root end thereof. U.S. Pat. No. 4,031,601, discloses using a rather complicated dovetail slot interface between a fiberglass blade and a hub wherein, additional, substantially liquified resin and fiberglass material are forced through a bore in the hub into a slot therein.

Recent advances in ram air turbine technology have also lead to the use of longer rotor blades. In order to be able to use an existing hub and counterweight system, for example, it is necessary to reduce the weight of the longer blades in order to keep centrifugal loading within acceptable limits. For this reason, there is a need for an improved root attachment for a composite turbine blade of a ram air turbine which is free of mechanical fasteners such as bolts, rivets or studs for avoiding vibratory fatigue and subsequent stress concentrations and also for reducing weight, which improved root attachment can be secured to a composite turbine blade in a manner which resists centrifugal loads, aerodynamic bending loads due to pressure loading, centrifugal bending loads, and torsional loads.

U.S. Pat. No. 4,834,616 discloses a self-locking retention system for a composite rotor blade supported on a rotor hub wherein the composite thickness is woven in a pattern which grips the retention member in response to outward forces applied to the rotor blade and the woven composite thickness. U.S. Pat. Nos. 2,115,454; 3,883,267; 4,648,921 and 4,834,616 and also German Patent No. 3,015,208 concern blades and the provision of attachments therefor.

DISCLOSURE OF INVENTION

Thus, an object of the present invention is to provide an improved root attachment for a composite turbine blade which avoids the aforementioned problems associated with the known root attachments. More particularly, an object of the invention is to provide an improved root attachment for a composite turbine blade of a ram air turbine which does not require that long continuous fibers be wound around the root attachment for securing the root attachment to the turbine blade, while at the same time permitting a connection between the root attachment and turbine blade which will effectively resist centrifugal loads, aerodynamic bending loads due to pressure loading, centrifugal bending loads and torsional loads placed on the blade and attachment during operation of the turbine.

A further object of the invention is to provide an improved method of making a composite turbine blade having a rotor attachment integrally formed therewith which does not require the tedious operation of laying continuous fibers into a mold thereby saving time and expense in the manufacture of the blades.

These and objects of the invention are attained by the improved root attachment of the invention which can be integrally molded with the turbine blade. The root attachment geometry is such that the molding compound material can easily flow about its surface during the molding process. The root attachment geometry is also effective to resist centrifugal loads, aerodynamic bending loads due to pressure loading, centrifugal bending loads, and torsion loads with the root fitting itself accounting for the load transfer between the fitting and the composite material of the blade. This is accomplished without the use of mechanical fasteners through the use of a dual load carrying technique of the improved root fitting.

This dual load carrying capability is achieved by the root attachment in that a mechanical locking and also an adhesive bonded joint occur between the root attachment and the material of the integrally molded composite turbine blade. The mechanical locking and the adhesive bond are designed to operate in parallel with each being designed to fail only above an ultimate load. The mechanical locking resists failure in bearing and provides adequate composite material interlock to prevent tearing the root attachment out of the blade. Adhesive bonding failure requirements are achieved by optimizing the root attachment surface area, for maximum contact surface with the composite material of the blade. The root attachment is manufactured from a material that is thermally compatible with the composite material of the blade, such that high thermal stresses do not result from the composite curing process.

More specifically, the improved root attachment of the invention comprises a one-piece metal member having an insert at one end which is adapted to be integrally molded within a composite turbine blade and a hub connector at an opposite end for connecting the turbine blade to a rotor turbine. The insert is configured such that the thickness of the insert tapers downwardly in the direction of the one end of the insert with the tapering side surfaces having surface undulations and wherein the one end of the insert is flared outwardly widthwise. Preferably, the tapering side surfaces of the insert each taper inwardly at an angle of between 10° and 15°. The tapering provides gradual load transfer from the composite to the root attachment. The surface undulations on the tapering sides provide additional area that takes bearing force. The flared end of the insert advantageously reacts torsional loads between the blade and the root attachment.

In the disclosed, preferred embodiment, the surface undulations of the tapering side surfaces extend in a direction transverse to the direction toward the one end of the root attachment. The insert is also angled relative to the longitudinal axis of the hub connector so that it extends along the centerline of the composite turbine blade after the blade is integrally molded about the insert. The insert has a minimum radius of curvature of 0.030 inch on its surfaces to prevent any tendency to propagate cracks along the turbine blade once the turbine blade is integrally molded to the insert.

The material of the root attachment is selected to prevent galvanic corrosion occurring during the life of the turbine as corrosion would undermine the composite-insert bonded interface such that the dual load carrying capability of the insert would be lost. The material of the root attachment in the disclosed embodiment is a titanium alloy but other high strength, corrosion resistant metals such as stainless steel could be used.

Another feature of the invention is that the insert of the root attachment is coated with a primer before molding to improve adherence of the composite turbine blade to the insert. In the disclosed embodiment an epoxy resin is applied to the insert. This enables the high strength adhesive bond to be formed between the insert and the composite material of the blade to resist failure under therein tensile loads up to 16,500 pounds, for example.

The present invention further includes a composite turbine blade comprising a molded blade of chopped fiber material with a matrix material, e.g. an epoxy resin. One end of the blade has a rotor attachment according to the invention integrally molded within the blade. The chopped fiber is short, for example one inch lengths of graphite fibers are employed, in order that under the application of heat and pressure during molding the material will flow into contact with the entire surface of the rotor attachment. The method of making a composite turbine blade of the invention comprises providing a rotor attachment of the invention and integrally molding the insert thereof in a chopped fiber material and a matrix material to form the composite turbine blade.

These and other objects, features and advantages of the present invention will become more apparent from the following description when taken in connection with accompanying drawings, which show, for purposes of illustration only, one preferred embodiment in accordance with present invention.

BRIEF DESCRIPTION OF THE DRAWINGS

FIG. 10 is an end view of the insert end of the root attachment of the invention taken in the direction of the longitudinal central axis of the hub connector of the root attachment;

FIG. 11 is a side elevational view of the root attachment as seen from the right side of FIG. 10;

FIG. 12 is an end view from the hub connector end of the root attachment taken from the right side of FIG. 11;

FIG. 13 is an elevational view of the root attachment taken from the lower side of the root attachment as shown in FIG. 11; and FIG. 14 is a cross-sectional view of the root attachment taken along the line G—G in FIG. 10.

BEST MODE FOR CARRYING OUT THE INVENTION

Figure 1:
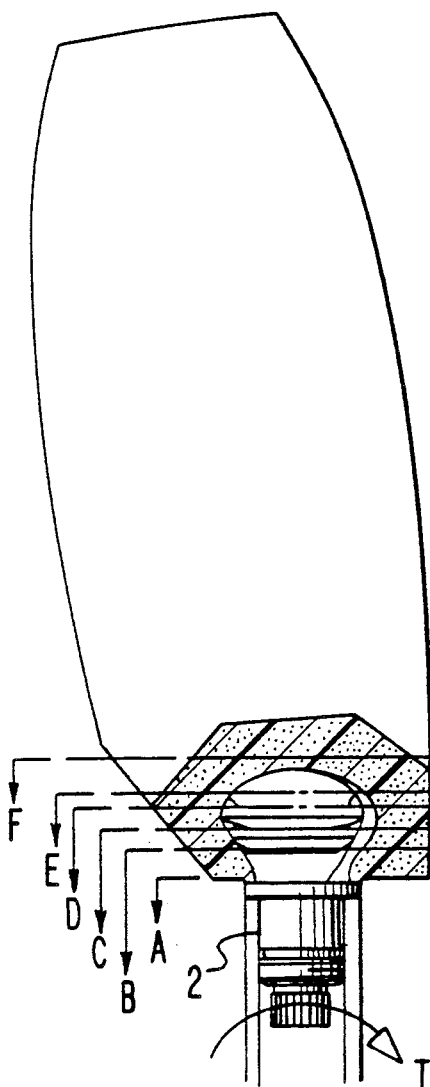
FIG. 1 is an elevational view of a composite turbine blade according to the invention with a lower portion of the blade broken away, in cross-section to illustrate the rotor attachment of the invention integrally molded with the blade.
Figure 2:
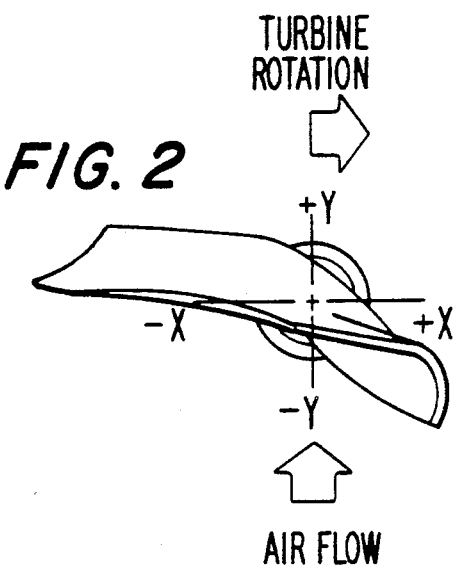
FIG. 2 is a top view of the composite turbine blade of Figure looking in the direction of the longitudinal center axis of the hub connector of the root attachment of the blade.
Figure 3:
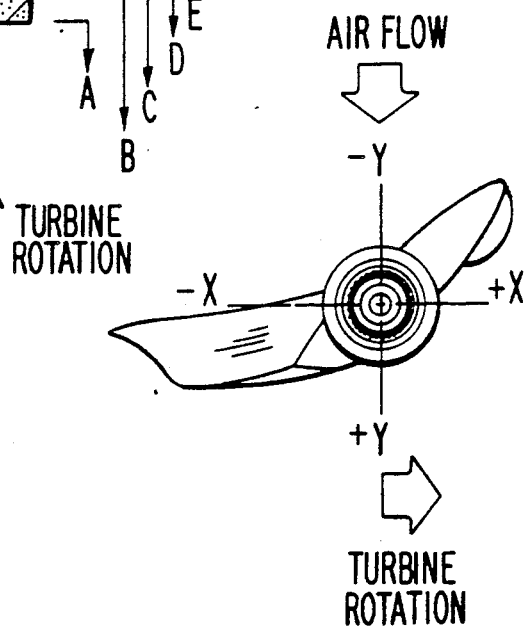
FIG. 3 is a view from the opposite end of the composite turbine blade of FIG. 1 from that shown in FIG. 2.
Figure 4:
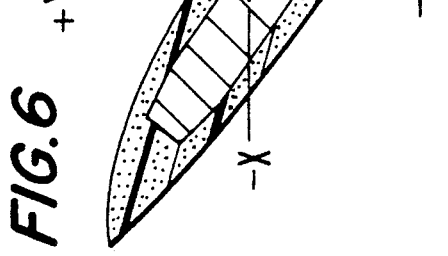
FIG. 4 is a cross-sectional view of the composite turbine blade of FIG. 1, without the lower portion being broken away, taken along the line A—A.
Figure 5:
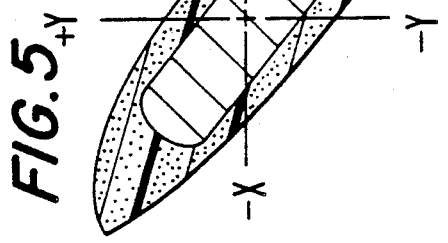
FIG. 5 is a view similar to FIG. 4 taken along the line B—B in FIG. 1.
Figure 6:
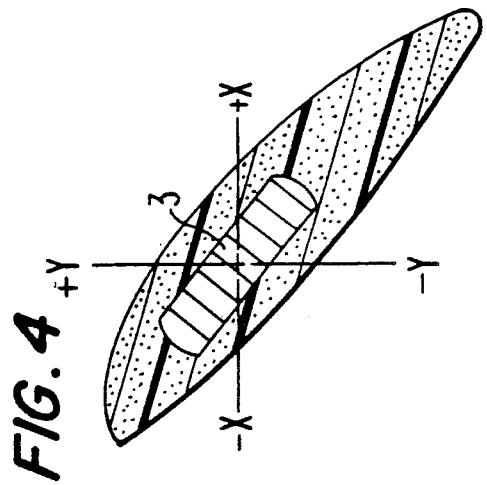
FIG. 6 is a cross-sectional view like FIGS. 4 and 5 but taken along the line C—C in FIG. 1.
Figure 7:
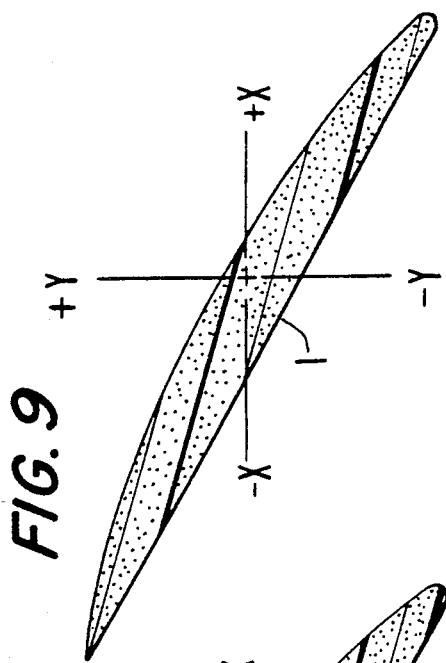
FIG. 7 is a cross-sectional view of the composite turbine blade but taken along the line D—D in FIG. I.
Figure 8:
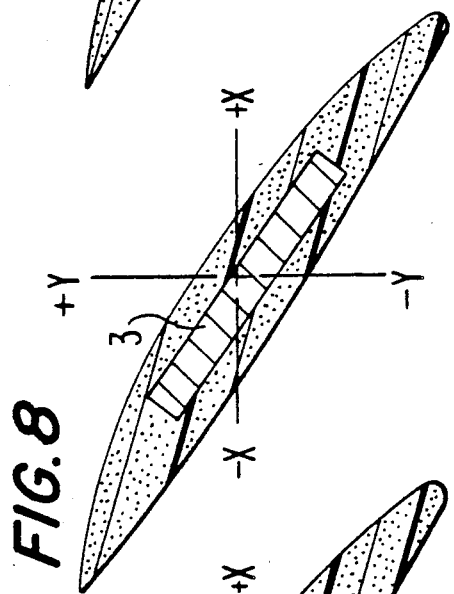
FIG. 8 is a cross-sectional view through the composite turbine blade of Figure taken along the line E—E where the lower portion of the turbine blade in FIG. 1 has not been broken away.
Figure 9:
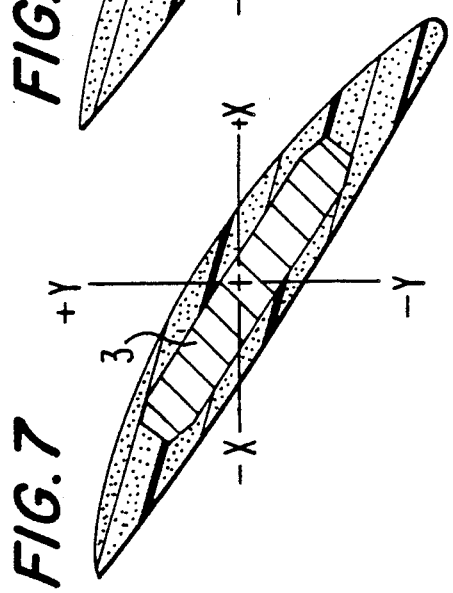
FIG. 9 is a cross-sectional view like FIGS. 4–8 except that it is taken along the line F—F in FIG. 1.

Referring now to the drawings, a composite turbine blade 1 according to the invention for a ram air turbine is illustrated in FIGS. 1-9. The root attachment 2 of the invention, which forms part of the turbine blade 1, appears in more detail in FIGS. 10·14. The method of the invention for making the composite turbine blade 1 comprises providing a root attachment 2 according to the invention and integrally molding an end thereof, referred to as the insert portion or insert 3, within the composite material of the turbine blade at the time of formation of the blade. The composite material for making of the turbine blade is preferably a fiber material, e.g. small diameter filaments of high strength, wherein the fibers have been "chopped" or formed with only a relatively short length, e.g. 0.2–2.0 inches. Illustratively, the chopped fibers can be small diameter graphite filaments having a length of one inch in a matrix of epoxy resin. The chopped fibers with epoxy resin, in the form of sheets cut to a specific shape and, typically 1/10 inch thick, is layered into a compression mold. The preformed sheets are placed in the mold on the respective sides of the root attachment and then the graphite-epoxy and root attachment are compression molded under a pressure of for example 1,000 psi and a temperature of for example 300° F. for a predetermined period of time, such as twenty minutes, so that the graphite-epoxy material flows into contact with the entire surface of the insert end, including the areas within undulation 4 which are formed in the insert as shown in the drawings and discussed in more detail below.

The length l of the insert 3 is optimized for shear and bearing strengths of the composite, depending upon the corresponding blade/turbine size. In the illustrated embodiment of the length l of the insert 3 which extends beyond the flange 5 of the root attachment 2 is 1.529 inches. The insert 3 as illustrated in FIG. 13, for example, is flared outwardly widthwise toward the free end of the insert to react to torsional loads. The minimum radius of curvature at the junctures of the several surfaces of the insert 3 is at least 0.030 inch to prevent any tendency to propagate cracks along the blade 1. The radius of curvature at the flared end 6 is 0.300 inch. A hub connector 7 is located at the end of the root attachment 2 opposite the insert 3 for connecting the turbine blade to a rotor hub, now shown. The structural configuration at the hub connector is conventional and therefore further discussion of it is omitted.

The insert 3 is configured such that the thickness of the insert tapers downwardly in the direction of the outer free end of the insert 3 with the tapering side surfaces 11 and 12 having surface undulations 4 as noted above. The undulations 4 of the tapering side surfaces extend in a direction traverse, at right angles, to the axis of the root attachment as shown in FIG. 13. The surface undulations 4 of the tapering side surfaces advantageously increase the maximum bearing area presented by the root attachment. The degree of taper of the side surfaces is preferably within the range of 10°–15° to provide gradual load transfer from the composite material of the blade to the rotor attachment and rotor hub. This angle is shown in FIG. 14 at $\alpha$.

More particularly, shown in FIG. 14, the thickness $t_1$ at the innermost projections 8 of the undulating surfaces 11 and 12 of the insert 3 is 0.549 inch. The thickness $t_2$ at the next outer projections 9 is 0.425 inch. The thickness $t_3$ of projections 10 adjacent the free end of the insert 3 is 0.349 inch. From these decreasing thicknesses, as well as the drawings themselves, which are to scale, the tapering nature of the side surfaces of the insert 3 is evident.

The insert 3 is angled to run along the centerline of the blade to prevent offset bending moments. As a result, the insert 3 forms an angle of 5°6′ with respect to the longitudinal central axis of the hub connector as illustrated at $\beta$ in FIG. 14. The insert is also twisted at a slight angle, e.g. 2° for this purpose. Further, the insert 3 is symmetric about its centerline to prevent undue bending stresses. The body of the insert 3 has it cross-sectional area maximized within the constraints of the base of the turbine blade to withstand maximum bending, torsional and centrifugal loads passing into the ram air turbine hub connection. In this regard, the thickness of the composite material about the insert is preferably no less than 0.100 inch.

To prevent galvanic corrosion occurring during the life of the ram air turbine, corrosion would undermine the composite-insert bonded interface so that the parallel failure path of bonding and mechanical lock would be lost, the metal of the rotor attachment 2 is preferably a high strength, corrosion resistant metal, namely a titanium alloy. In the illustrated embodiment the rotor attachment is formed of Ti-6Al-4V alloy. Alternatively, stainless steel could be used but it would result in a heavier composite turbine blade. The alloy can be investment cast and finish machined to the configuration illustrated in the application drawings. Alternatively, bar stock of the selected metal could be machined to produce the root attachment.

For obtaining the desired high strength adhesive bond between the insert 3 of the root attachment 2 and the molded composite material of the blade the insert 3 is preferably pretreated before bonding to enhance the adhesion of the composite material to the insert. Specifically, the titanium alloy insert is subjected to an alkali etch and then a primer coat is applied to improve adherence of the graphite epoxy material to the insert. Illustratively, an epoxy resin such as BR127 by American Cyanamid is applied and then cured for one-half hour at 250° F. The insert 3 is then subjected to molding according to the aforementioned method.

While we have shown and described only one embodiment in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of the appended claims.

We claim:

1. A root attachment adapted to be integrally molded with a composite turbine blade for supporting the turbine blade on a rotor hub, comprising an insert at one end of the rotor attachment adapted to be integrally molded within a composite turbine blade and a hub connector at the opposite end of the root attachment for connecting the turbine blade to a rotor hub, wherein the insert is configured such that the thickness of the insert tapers downwardly in the direction of the one end of the insert with the tapering side surfaces having surface undulations and wherein the one end of the insert is flared outwardly widthwise, and wherein the insert is angled relative to the longitudinal axis of the hub connecter so that it extends along the central line of the composite turbine blade after the blade is integrally molded with the insert.

2. A root attachment according to claim 1, wherein said angle with respect to the longitudinal axis of the hub connector is 5°6′.

3. A composite turbine blade comprising a molded blade of chopped fiber material in a matrix material, one end of the blade having a rotor attachment integrally molded with the blade, the rotor attachment including an insert at one end which is integrally molded within the blade and a hub connecter at an opposite end for connecting the turbine blade to a rotor hub, wherein the insert is configured such that the thickness of the insert tapers downwardly in the direction of the one end of the insert with the tapering side surfaces having surface undulations and wherein the one end of the insert is flared outwardly widthwise, wherein the insert is angled relative to the longitudinal axis of the hub connector so that it extends along the centerline of the composite turbine blade.

4. The composite turbine blade according to claim 3, wherein the angle of the insert relative to the longitudinal axis of the hub connector is 5°6'.

* * * * *